(12) United States Patent
Bryan

(10) Patent No.: US 7,712,023 B1
(45) Date of Patent: May 4, 2010

(54) DYNAMICALLY MODIFYING DESCRIPTIVE TEXT OF A FORM WORKSHEET FIELD IN RESPONSE TO A FINANCIAL FORM SELECTION

(75) Inventor: Donald E. Bryan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1130 days.

(21) Appl. No.: 11/345,250

(22) Filed: Jan. 31, 2006

(51) Int. Cl.
*G06F 17/24* (2006.01)
(52) U.S. Cl. ............... 715/223; 715/222; 705/31
(58) Field of Classification Search ......... 715/221–226; 705/31
See application file for complete search history.

(56) References Cited

U.S. PATENT DOCUMENTS

| | | | | |
|---|---|---|---|---|
| 5,193,057 A | * | 3/1993 | Longfield | 705/31 |
| 6,202,052 B1 | * | 3/2001 | Miller | 705/31 |
| 6,912,508 B1 | * | 6/2005 | McCalden et al. | 705/31 |
| 2002/0194221 A1 | * | 12/2002 | Strong et al. | 707/513 |
| 2005/0033690 A1 | * | 2/2005 | Antognini et al. | 705/40 |

OTHER PUBLICATIONS

Taxcut 2002 'Whose Expenses' screendumps, H & R Block, 2002.*

* cited by examiner

*Primary Examiner*—Cesar B Paula
(74) *Attorney, Agent, or Firm*—Oaha • Liang LLP

(57) ABSTRACT

A method for supporting a plurality of financial source forms that includes receiving a user selection of a source form of the plurality of financial source forms to obtain a user-selected source form, and dynamically populating field text within a plurality of dynamic fields on a worksheet associated with the user-selected source form, wherein the worksheet is used for tax preparation.

18 Claims, 6 Drawing Sheets

DYNAMICALLY MODIFYING DESCRIPTIVE TEXT OF A FORM WORKSHEET FIELD IN RESPONSE TO A FINANCIAL FORM SELECTION

BACKGROUND

Every year millions of people, companies, and other institutions file various documents with the different governing bodies, such as agencies and services of local, state and national governments. The documents may be directed toward filing taxes, inventory and accounting filings, medical reimbursement filings, etc.

Each document is typically designed around the concept of forms. Specifically, a document may be composed of one or more forms. A form includes multiple data-containing fields and static text describing and relating to the data containing fields. The fields may be user-generated or calculated. A user-generated field is a field which has data from the user or an outside resource. A calculated field is a field in which the data in the field is the output of an equation involving other fields.

Each field in document is typically entered with data representing a concatenation of various pieces of information. For example, on an accounting sheet, the data representing a summary of pension fund payments may include several pieces of information (e.g., the amount of pension fund payments paid, the amount of pension funds due, the amount of pension funds remaining).

Accordingly, a form may be a source form and/or a target form. A source form contains the information to enter into a target form. Thus, a source form is often generated by an outside source other than the person filing the document.

Software products include several methods for simplifying inputting the data into the documents. For example, a software product may include a worksheet having a questionnaire. The worksheet is typically a target form with the questionnaire in static text. The user answers the questions or inputs text in user-modifiable fields.

For example, a person receiving a pension may use information from a source form from a previous employer to enter data in an Internal Revenue Service (IRS) target form. The information may be used in multiple fields or may be concatenated with other information into a single field.

Often, source forms are related by having similar treatment of the same data. Specifically, the field names within the family may change however, data from the source forms in the same family may use similar calculations to create the target form. For example, the tax treatment of annuities listed on Office of Personnel Management (OPM) Forms CSA-1099-R and CSF-1099-R are essentially the same as the tax treatment of annuities on IRS Form 1099-R. Accordingly, a user, ignoring the static text describing the fields, may use data from OPM Form CSA-1099-R and OPM Form CSF-1099-R to fill in IRS Form 1099-R and obtain correct calculations for the user's taxes. Thus, a user having an OPM Form CSA-1099-R may ignore the static text questionnaire to enter data into the worksheet that describes the IRS Form 1099-R.

SUMMARY

In general, in one aspect, the invention relates to a method for supporting a plurality of financial source forms that includes receiving a user selection of a source form of the plurality of financial source forms to obtain a user-selected source form, and dynamically populating field text within a plurality of dynamic fields on a worksheet associated with the user-selected source form, wherein the worksheet is used for tax preparation.

In general, in one aspect, the invention relates to a computer usable medium comprising computer readable program code embodied therein for causing a computer system to receive a user selection of a source form of the plurality of financial source forms to obtain a user-selected source form, and dynamically populate field text within a plurality of dynamic fields on a worksheet associated with the user-selected source form, wherein the worksheet is used for tax preparation.

In general, in one aspect, the invention relates to a system for supporting a plurality of financial forms that includes a worksheet for receiving a user selection of a source form of the plurality of financial source forms to obtain a user-selected source form, and an application logic connected to the worksheet and configured to dynamically populate field text within a plurality of dynamic fields on a worksheet associated with the user-selected source form, wherein the worksheet is used for tax preparation.

In general, in one aspect, the invention relates to a data structure that includes a first element comprising field text, and a second element comprising a plurality of financial source forms, wherein a tax preparation worksheet associated with the second element is dynamically populated with the first element based on a user selecting a source form from the plurality of financial source forms.

Other aspects of the invention will be apparent from the following description and the appended claims.

BRIEF DESCRIPTION OF DRAWINGS

FIGS. 3A-3C show an example user interface in accordance with one or more embodiments of the invention.

DETAILED DESCRIPTION

Figure 1:
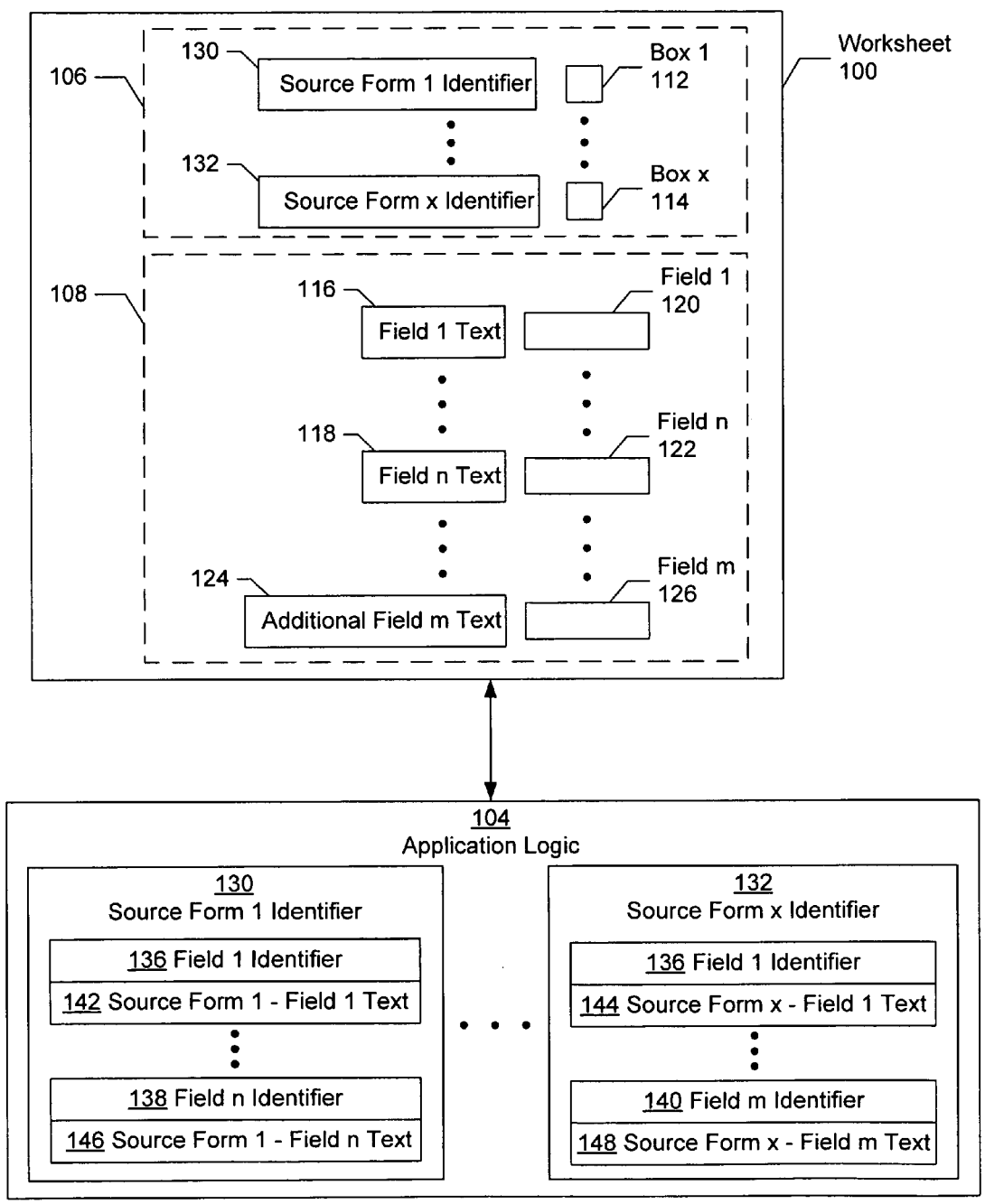
FIG. 1 shows a schematic diagram of a system for supporting financial source forms in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for supporting multiple financial source forms in tax documents. Specifically, embodiments of the invention dynamically modify text previously considered static in a worksheet. More specifically, rather than only allowing for user-generated data within a field to change, the field text that describes the content of a particular user-modifiable field may also change. Accordingly, rather than having to create an individual worksheet for each type of form, embodiments of the invention provide a mechanism whereby the same worksheet may be used for multiple financial source forms.

FIG. 1 shows a schematic diagram of a system for supporting financial source forms in accordance with one or more embodiments of the invention. In one or more embodiments of the invention, the system corresponds to one or more applications that allows a user (not shown) to enter data into a form. A user may correspond to an individual, group, or automated device that enters data on behalf of an entity (e.g., business, organization, person, family, etc.) for entering data into a target form in accordance with one or more embodiments of the invention. The application(s) may correspond to a compiled executable, source code, or any other form known in the art. Further, the application(s) may execute on any computing system (e.g., laptop, desktop, server, cellphone, personal digital assistant, or any other such system).

As shown in FIG. 1, the system includes a worksheet (100) and application logic (104). Each of these components is described below.

The worksheet (100) corresponds to a user interface portion of an application in accordance with one or more embodiments of the invention. Specifically, the worksheet (100) corresponds to the portion of the application that interacts with the user with visual or auditory text. Accordingly, the worksheet (100) corresponds to a target form with which a user may enter data from one or more source forms (not shown).

In one or more embodiments of the invention, the worksheet (100) corresponds to a questionnaire for a user to enter financial data from a financial source form. The source form may correspond to any type of form containing financial, health, or other such information for the user. For example, the financial source form may correspond to a pension distribution form that is provided to a former employee by a previous employer.

The worksheet (100) includes a portion for a user to select the specific type of source form (106) and a portion for a user to enter data based on the selected source form (108). The aforementioned components are described below.

The portion for a user to identify the source form (106) includes source form identifiers (e.g., source form 1 identifier (130), source form x identifier (132)) and a box (e.g., box 1 (112), box x (114)) for each source form identifier (e.g., source form 1 identifier (130), source form x identifier (132)). The source form identifier (e.g., source form 1 identifier (130), source form x identifier (132)) may correspond to a form name (e.g., Statement of Survivor Annuity Paid, Annuities or Pensions by the Railroad Retirement Board, and other such name), form number (e.g., 1099-R, CSA-1099-R, CSF-1099-R, RRB-1099-R, W-2, W-2-G, 1099-G, and other such form numbers), or any other unique identifier for a source form.

Each source form identifier (e.g., source form 1 identifier (130), source form x identifier (132)) is associated with a box (e.g., box 1 (112), box x (114)) in which a user, by selecting the box (e.g., box 1 (112), box x (114)), may select the form designated by the source form identifier (e.g., source form 1 identifier (130), source form x identifier (132)). The box (e.g., box 1 (112), box x (114)) may correspond to a radio button, check box, drop-down menu containing the source form identifiers (e.g., source form 1 identifier (130), source form x identifier (132)), a button that a user clicks to select the form, or any other such selection mechanism for a user to select a form. In one or more embodiments of the invention, the selection of the form is mutually exclusive. Specifically, the box (e.g., box 1 (112), box x (114)) includes functionality to regulate that only one box (e.g., box 1 (112), box x (114)) may be selected at a time.

Alternatively, rather than listing the source form identifiers (e.g., source form 1 identifier (130), source form x identifier (132)), in one or more embodiments of the invention, the user may simply type in a source form identifier (e.g., source form 1 identifier (130), source form x identifier (132)) in a separate field on the worksheet, which would result in selecting the form that matches the typed source form identifier.

Besides the worksheet having a portion for a user to select a form (106), the worksheet also includes a portion for a user to enter data based on the selected form (108). The portion for the user to enter data based on the selected form (108) includes fields (e.g., field 1 (120), field n (122), field m (126)) and field text (e.g., field 1 text (116), field n text (118), additional field m text (124)) associated with the fields. The fields (e.g., field 1 (120), field n (122), field m (126)) may be user-generated or calculated. A user-generated field is a field which has data from the user or an outside resource. The user-generated fields correspond to any mechanism (e.g., input field, a radio button, check box, drop-down menu, or any other such mechanism) in which a user may make a selection to enter data. A calculated field is a field in which the data in the field is the output of an equation involving other fields. Each field (e.g., field 1 (120), field n (122), field m (126)) is associated with field text (e.g., field 1 text (116), field n text (118), additional field m text (124)).

The field text (e.g., field 1 text (116), field n text (118), additional field m text (124)) corresponds to text describing how to enter the data or otherwise relating to a user entering data in the associated field (e.g., field 1 (120), field n (122), field m (126)).

In one or more embodiments of the invention, the field text (e.g., field 1 text (116), field n text (118), additional field m text (124)) corresponds to a calculated field. Specifically, the field text (e.g., field 1 text (116), field n text (118), additional field m text (124)) is calculated based on input into the portion of the worksheet (100) for a user to identify the source form (106).

Accordingly, in one or more embodiments of the invention, the field text (e.g., field 1 text (116), field n text (118), additional field m text (124)) is dynamic. Specifically, the field text (e.g., field 1 text (116), field n text (118), additional field m text (124)) may be changed while the worksheet is presented to the user.

For example, when a user selects an Office of Personnel Management (OPM) Form CSA-1099-R, the field text (e.g., field 1 text (116), field n text (118), additional field m text (124)) describes how the user is to enter data from the OPM Form CSA-1099-R. Similarly, when a user selects an OPM Form CSF-1099-R, the field text describes how the user is to enter data from the OPM Form CSF-1099-R.

Further, as shown in FIG. 1, the field text (e.g., field 1 text (116), field n text (118), additional field m text (124)) may include additional field text (e.g., additional field m text (124)). The additional field text (e.g., additional field m text (124)) and any associated box(es) correspond to fields that do not correlate to a default text.

For example, a Railroad Retirement Board (RRB) Form RRB-1099-R (hereinafter "Form RRB-1099-R") includes additional information and therefore requires the user to enter more information in the fields than is necessary for an IRS Form 1099-R. Accordingly, suppose the default text for a field on a worksheet is based on the 1099-R form. Then, in one or more embodiments of the invention, when the field text (e.g., field 1 text (116), field n text (118), additional field m text (124)) describes how a user is to enter data from the Form RRB-1099-R, additional field text (e.g., additional field m text (124)) with associated boxes (e.g., field m box (126)) may also be displayed.

Those skilled in the art will appreciate that the worksheet (100) may also include static fields and static field text. Static fields and static field text correspond to fields and field text that are not modified based on input into the portion of the worksheet (100) for a user to identify the source form (106).

Further, the worksheet (100) may correspond to a single virtual page of the application in accordance with one or more embodiments of the invention. Specifically, rather than continually loading multiple pages where the text for a consecutive page is based on the user's answers provided in the previous page, a single virtual page may be used.

Alternatively, the source form identifier (e.g., source form 1 identifier (130), source form x identifier (132)) may be located on a virtual page separate from the field text (e.g., field 1 text (116), field n text (118), additional field m text (124)) or the field text (e.g., field 1 text (116), field n text (118), additional field m text (124)) may be located on different virtual pages.

Further, those skilled in the art will appreciate that the location of the field text (e.g., field 1 text (116), field n text (118), additional field m text (124)) on a page may be dynamic. Specifically, the field text (e.g., field 1 text (116), field n text (118), additional field m text (124)) may change positions based on the form described by the field text (e.g., field 1 text (116), field n text (118), additional field m text (124)).

Continuing with FIG. 1, the system also includes application logic (104). The application logic (104) corresponds to any mechanism for performing the application that is not visible to the user. Specifically, the application logic (104) may include the logic necessary to relate a source form identifier (e.g., source form 1 identifier (130), source form x identifier (132)) and a field identifier (e.g., field 1 identifier (136), field n identifier (138), field m identifier (140)) with the appropriate, associated text (e.g., form 1-field 1 text (142), form x-field 1 text (144), form 1-field n text (146), form x-field m text (148)).

Accordingly, the application logic (104) correspond to the calculations required to populate the field text (e.g., field 1 text (116), field n text (118), additional field m text (124)) based on a selected source form identifier (e.g., source form 1 identifier (130), source form x identifier (132)). One method of performing the calculations to perform the calculations is through the use of conditional expressions within the application logic (104). Alternatively, the application logic (104) may correspond to an engine and a storage unit (e.g., file, relational or hierarchical database, spreadsheet, or any other such mechanism for storing data). The engine of the application logic (104) may query the storage unit to populate the field text (e.g., field 1 text (116), field n text (118), additional field m text (124)).

Continuing with FIG. 1, A group of relationships may exist within the application logic. In one or more embodiments of the invention, the relationships define a group of field text (e.g., form 1-field 1 text (142), form x-field 1 text (144), form 1-field n text (146), form x-field m text (148)), which are particular to each source form identifier. For example, the application logic may include the relationship dictating that for source form "1099-R", field 1 text is "gross distribution" while for source form RRB-1099-R field 1 text is "total gross paid."

Accordingly, each source form identifier entry may relate to one or more entries corresponding to field identifier (e.g., field 1 identifier (136), field n identifier (138), field m identifier (140)). Specifically, in one or more embodiments of the invention, all fields in the source form have an entry in the application logic (104) that relates the field (with the field text) to the source form identifier of the source form.

A field identifier (e.g., field 1 identifier (136), field n identifier (138), field m identifier (140)) uniquely identifies a field (e.g., field 1 (120), field n (122), field m (126)) in a tax preparation worksheet. Specifically, the field identifier (e.g., field 1 identifier (136), field n identifier (138), field m identifier (140)) may correspond to a name of the field, a number representing the concatenation of the worksheet name and location on the worksheet, or any other such identifier that uniquely identifies the field (e.g., field 1 (120), field n (122), field m (126)).

Those skilled in the art will appreciate that in one or more embodiments of the invention, every combination of form and field has a one-to-one relationship with text specific to the form and field.

Figure 2:
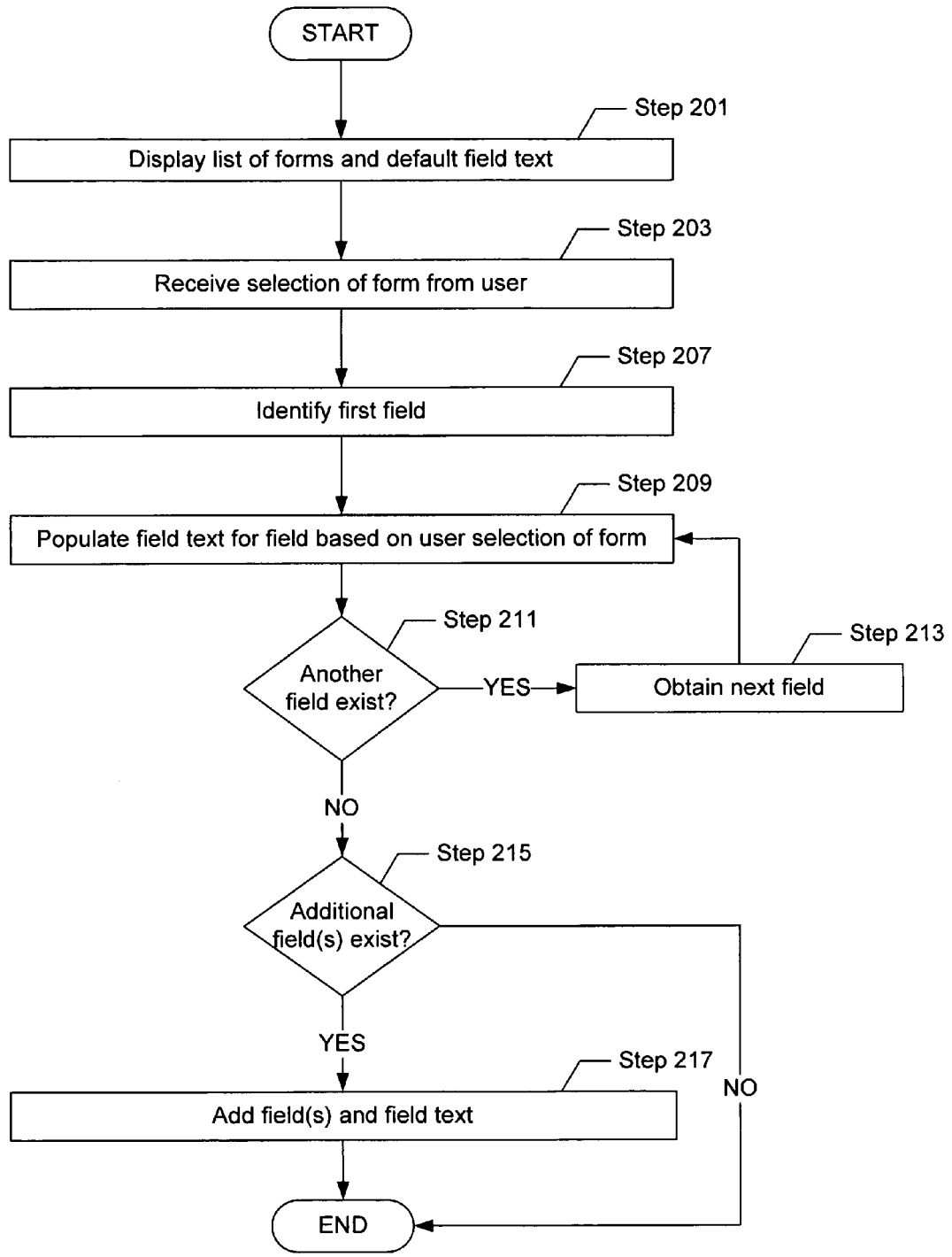
FIG. 2 shows a flow diagram of a method for supporting financial source forms in accordance with one or more embodiments of the invention.

FIG. 2 shows a flow diagram of a method for supporting various financial source forms with a worksheet in accordance with one or more embodiments of the invention. Initially, the list of forms and default field text is displayed (Step 201). Specifically, the list of forms and default field text is displayed when the application is loaded. When the default field text is displayed, the boxes and fields for the user to enter data may also be displayed. Those skilled in the art will appreciate that rather than displaying default text, in one or more embodiments of the invention, no default field text is displayed until a user makes a selection on a form.

Next, a selection of a specific type of form is received from the user (Step 203). The user may select the type of form by clicking on a check box, radio button, selecting from a list, typing in identifier(s) for the form, or using any other such technique. The act of selecting the form may trigger an interrupt or other such signal to activate the application logic. Alternatively, the application logic may poll the worksheet to determine whether the user has made a selection.

Once the selection of a form is received, the first field on the worksheet is identified (Step 207). The first field corresponds to any field with field text in the worksheet that is to be modified. Those skilled in the art will appreciate that the first field may correspond to any field regardless of location on the form. Next, the appropriate field text associated with the selected form is populated into the field on the worksheet (Step 209) (i.e., the appropriate field text for the selected form replaces what appeared in the field (if anything) prior to the user selecting the type of form). In one or more embodiments of the invention, the field text is populated using a calculated field. Further, in one or more embodiments of the invention, only the portion of the user display screen that contains the default field text is replaced dynamically with the text specified in the application logic based on the selected form. For example, the application logic may include a conditional statement that specifies when a certain form is selected. Once the form is selected, the field text for the first calculated field is re-calculated and changed to different text corresponding to the selected form.

Those skilled in the art will appreciate that the location of the text may change. Accordingly, the default field text may be removed from the worksheet and added text specified by the application logic may be added to the worksheet in a different location.

After populating the default field text, a determination is made whether another field exists (Step 211). Specifically, a determination is made whether the application logic specifies that another field text associated with a field should dynamically change. If another field exists, then the next field is obtained (Step 213). The method repeats until fields on the worksheet have been populated. Of course, in one or more embodiments of the invention, the population of fields on the worksheet is performed in such a manner that the population of the text appears simultaneous for all fields.

Alternatively, once all fields on the worksheet have been populated, a determination is made whether additional fields exist (Step 215). If additional field(s) exists, then the field(s) and field text may be added by the application logic for the additional field(s).

Those skilled in the art will appreciate, however, that the calculations and equations that rely on the field may also be dependent on the type of source form. Therefore, the calculations may also be dynamically updated according to the selected source form.

Once all fields specified have been populated, then the user may input data into the worksheet using the fields in a manner consistent with the selected form.

Figure 3A:
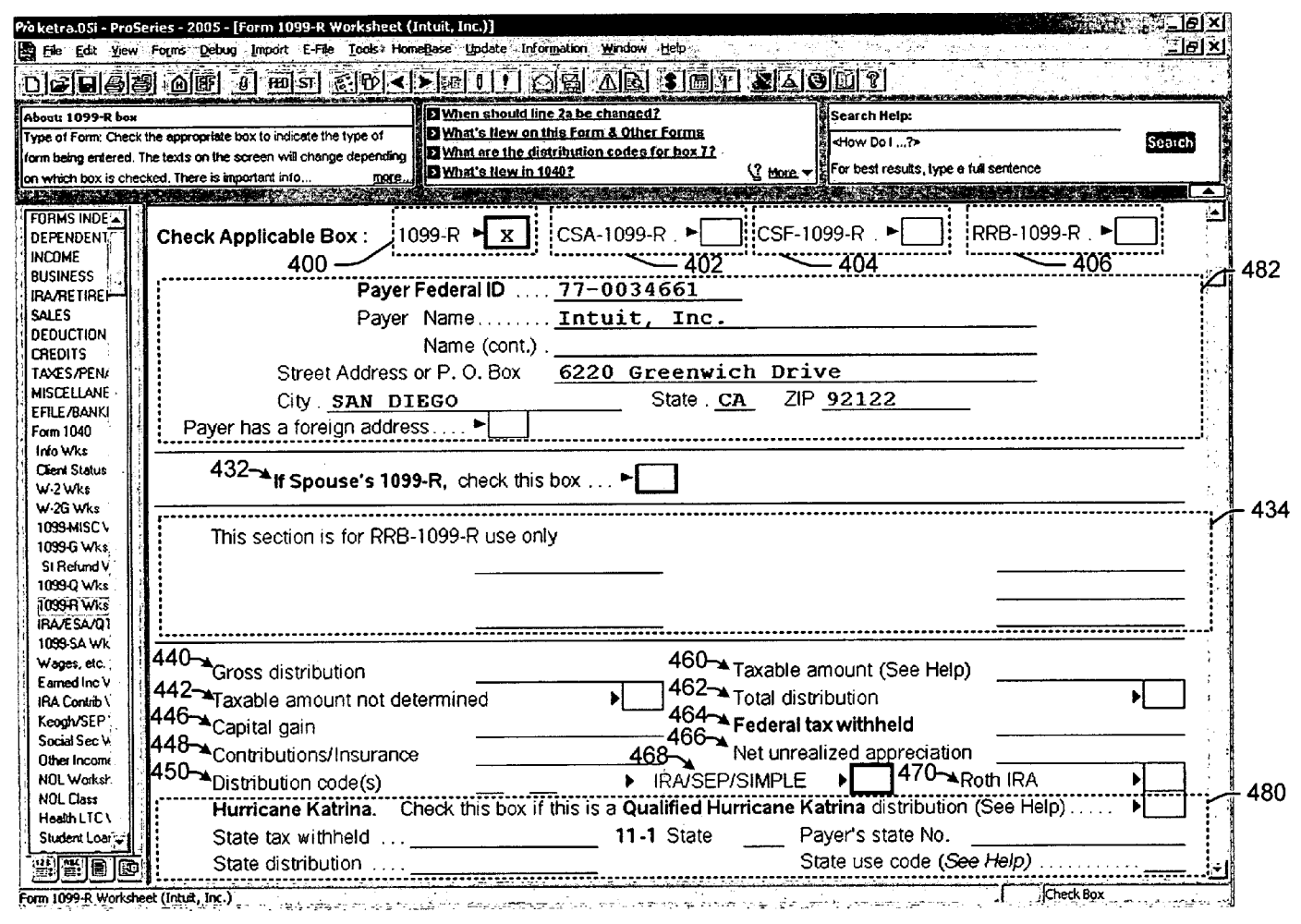
Figure 3B:
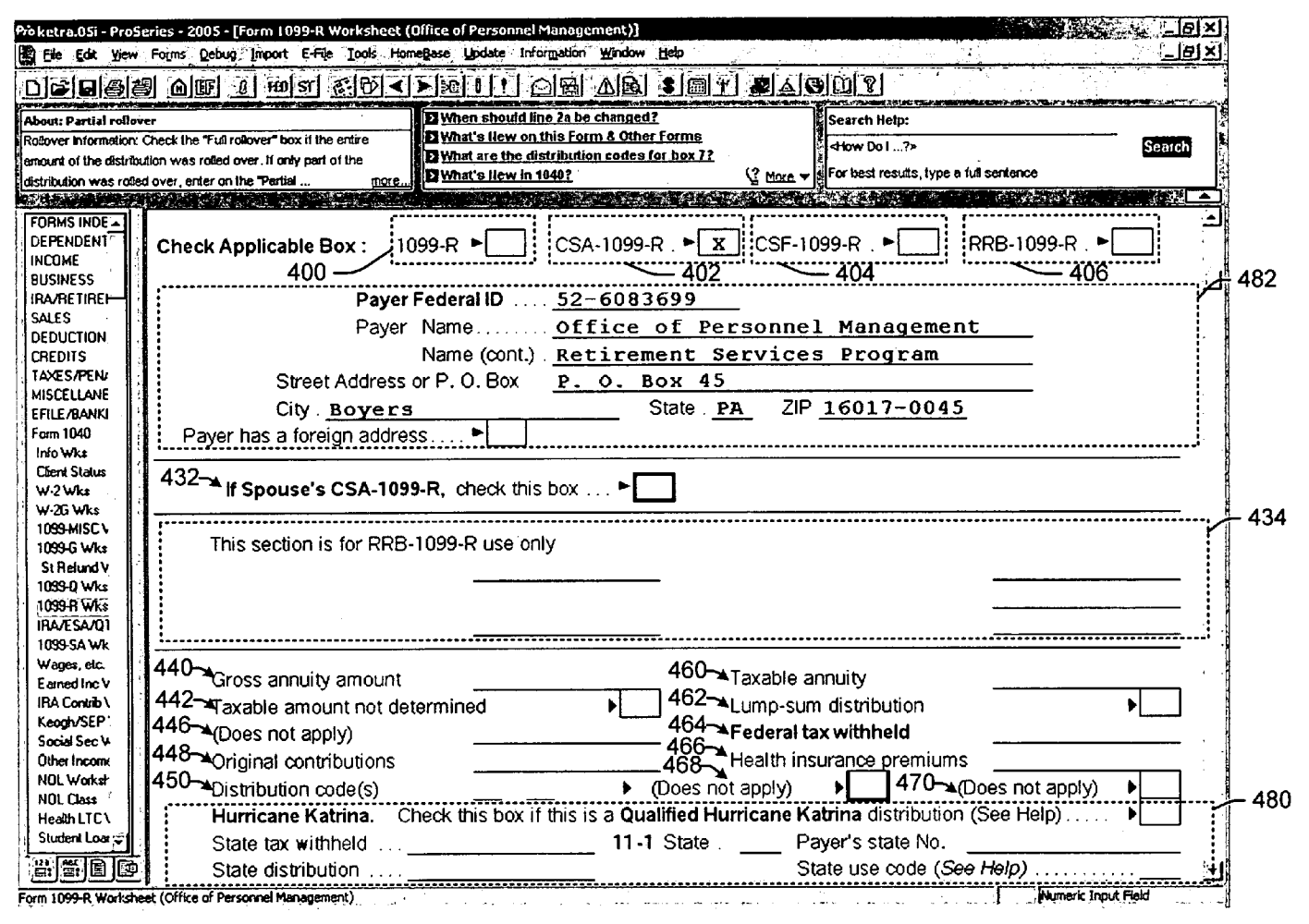
Figure 3C:
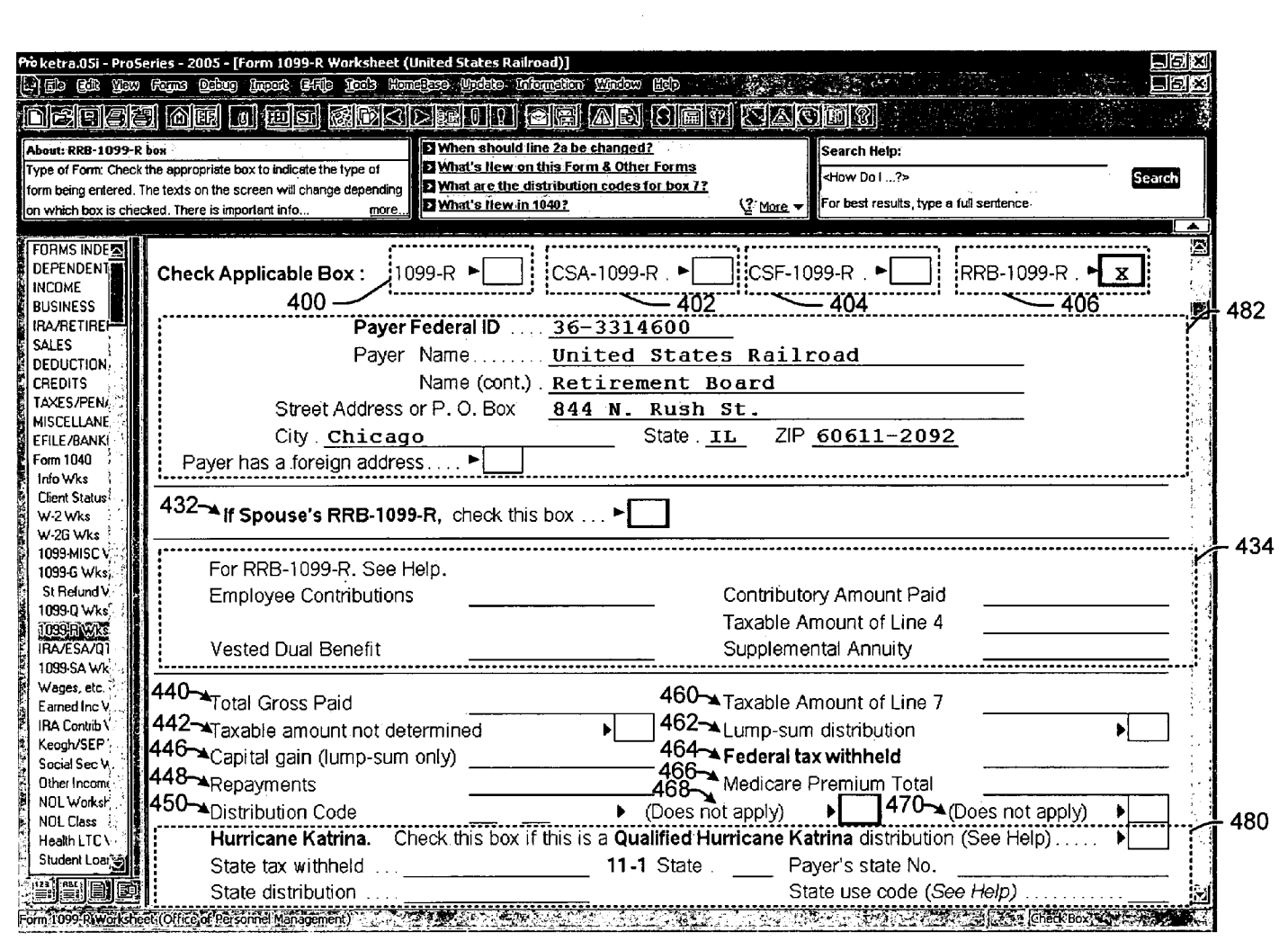

FIGS. 3A-3C show an exemplary user interfaces in accordance with one or more embodiments of the invention. In FIGS. 3A-3C, reference characters refer to the field identifiers (not shown). Specifically, reference characters are the same when the reference characters refer to fields that have the same field identifier.

For the example shown in FIGS. 3A-3C, consider the case in which an application allows the user to enter data from IRS Form 1099-R, OPM Form CSA-1099-R, OPM Form CSF-1099-R, and Form RRB-1099-R into a worksheet. While each of the aforementioned pension distribution forms use different phrases, each of the aforementioned forms are treated similarly with respect to taxes. Accordingly, in the application, a user may check the appropriate box (e.g., 1099-R (400), CSA-1099-R (402), CSF-1099-R (404), RRB-1099-R (406)) that correlates to the form that the user has received from an outside resource.

For example, as shown in FIG. 3A, a user has selected IRS Form 1099-R (400). In one or more embodiments of the invention, upon selection of the box associated with form 1099-R (400), the user is immediately able to view the field text for the form 1099-R. Accordingly, the field text that relates solely to RRB-1099-R (434) is left blank. Further, the field text for entering tax information from the 1099-R form is updated for using an IRS Form 1099-R. For example, the field text for the center field (432) is set to "If Spouse's 1099-R, check this box." Further, the field text for the lower fields includes the text "Gross distribution" (440), "Capital gain" (446), "Contributions/Insurance" (448), "Distribution code(s)" (450), "Taxable amount (See Help)" (460), "Total distribution" (462), "Net unrealized appreciation" (466), "IRA/SEP/SIMPLE" (468), and "Roth IRA" (470). Further, fields and field text on the worksheet may also be static (e.g., "Taxable amount not determined" (442), "Federal tax withheld" (464), user information text (482), text identifying state and victim status (480)).

Next, suppose a user realized that the source form is an OPM Form CSA-1099-R as shown in FIG. 3B. Accordingly, the user selects the box associated with OPM Form CSA-1099-R (402), and the field text is automatically, dynamically recalculated. Similar to FIG. 3A, the field text that relates solely to IRS Form RRB-1099-R (434) is left blank. However, the field text for entering tax information from the CSA-1099-R form is updated for using OPM Form CSA-1099-R. For example, the field text for the center field (432) is set to "If Spouse's CSA-1099-R, check this box." Further, the field text for the lower fields includes the text "Gross annuity amount" (440), "(Does not apply)" (446), "Original contributions" (448), "Distribution code(s)" (450), "Taxable annuity" (460), "Lump-sum distribution" (462), "Health Insurance Premiums" (466), "(Does not apply)" (468), and "(Does not apply)" (470). Further, the static fields and field text on the worksheet (e.g., "Taxable amount not determined" (442), "Federal tax withheld" (464), user information text (482), text identifying state and victim status (480)) are not recalculated.

Finally, suppose a user selects a Form RRB-1099-R form as shown in FIG. 3C. Accordingly, the user selects the box associated with Form RRB-1099-R (406), and the field text is automatically, dynamically recalculated. Accordingly, the field text that relates solely to Form RRB-1099-R (434) is now entered with text. Further, the field text for entering tax information from the Form RRB-1099-R (430) is updated for using a RRB-1099-R form. For example, the field text for the center field (432) is set to "If Spouse's RRB-1099-R, check this box." Further, the field text for the lower fields includes the text "Total Gross Paid" (440), "Capital gain (lump-sum only)" (446), "Repayments" (448), "Distribution code" (450), "Taxable amount of Line 7" (460), "Lump-sum distribution" (462), "Medicare Premium Total" (466), "(Does not apply)" (468), and "(Does not apply)" (470). Further, the static fields and field text on the worksheet (e.g., "Taxable amount not determined" (442), "Federal tax withheld" (464), user information text (482), text identifying state and victim status (480)) are not recalculated.

As shown in FIGS. 3A-3C, by simply changing the field text, a user is easily able to relate the pension distribution source form provided by an outside source with the worksheet questionnaire in the application. Further, in accordance with one or more embodiments of the invention, a programmer or administrator does not need to create a new worksheet for each source form. Specifically, in such embodiments, the actual fields in which the user may enter data remain the same. Accordingly, embodiments of the invention allow for a programmer to program the application only once while allowing a user to use a familiar interface. Further, changes to text in the fields do not require the creation of a new worksheet; instead, only changes to the field text are required.

Figure 4:
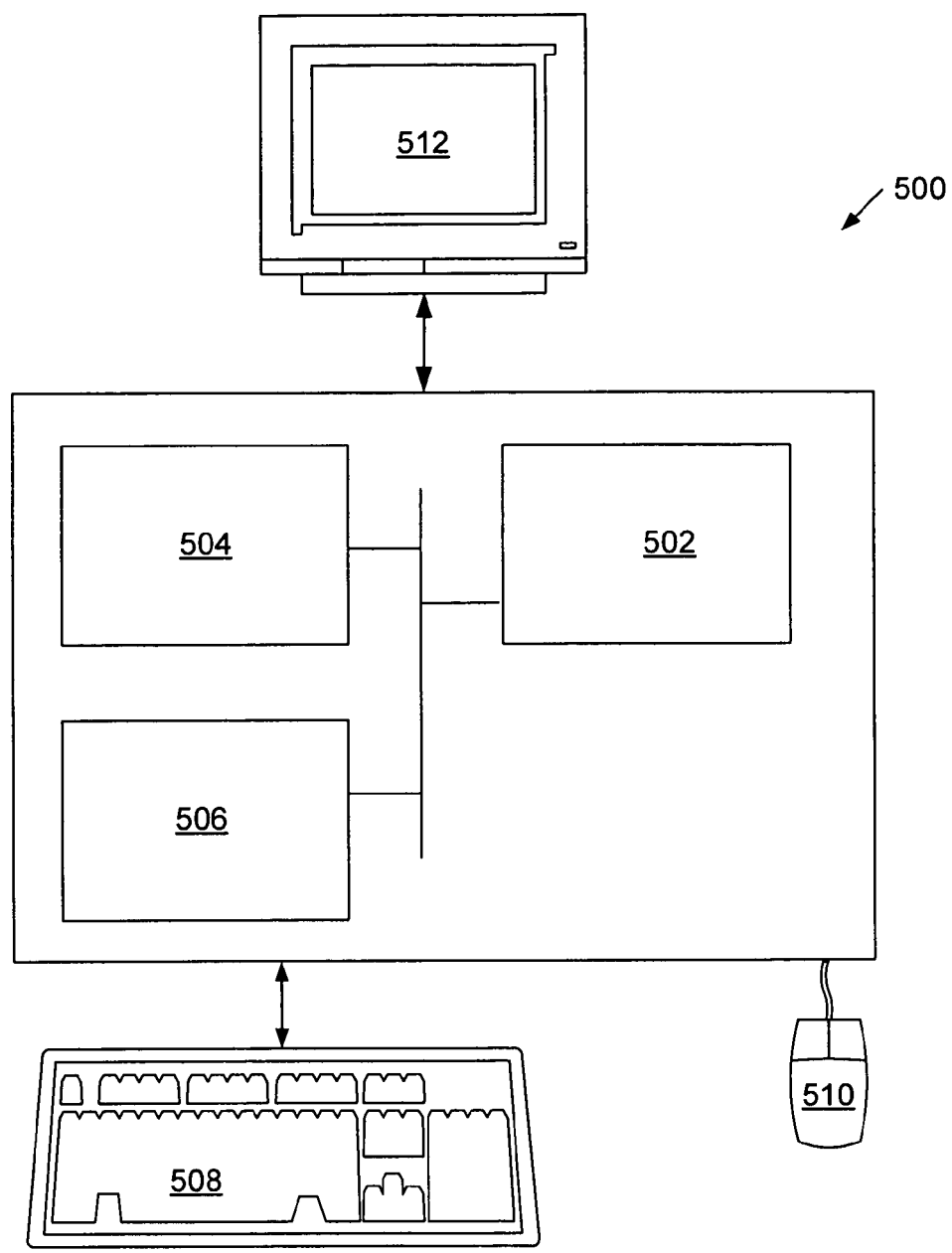
FIG. 4 shows a computer system in accordance with one or more embodiments of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., worksheet, mapping engine, mapping rule repository) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention provide a mechanism whereby the same worksheet may be used to support multiple forms. Specifically, in a family of related forms, such as pension distribution forms, the same worksheet may be used in a user-friendly format. More specifically, rather than a user ignoring the static text of a field in order to enter data into the worksheet, the text is dynamically updated so that the user can answer questions based on the form the user is using.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for supporting a plurality of financial source forms comprising:
    displaying, within a user interface, a worksheet comprising a user-modifiable field;
    receiving, after displaying the worksheet, a user selection of a source form of the plurality of financial source forms to obtain a user-selected source form; and
    dynamically populating, using a computer processor, the worksheet with field text selected using conditional logic based on the user-selected source form,
    wherein the field text is positioned on the worksheet outside the user-modifiable field,
    wherein the field text describes content of the user-modifiable field, and
    wherein the worksheet is used for tax preparation.

2. The method of claim 1, wherein dynamically populating the worksheet with field text comprises selecting the field text by re-calculating a conditional expression within a calculated field on the worksheet.

3. The method of claim 1, wherein at least one of the plurality of financial source forms is a pension distribution form.

4. The method of claim 1, further comprising dynamically updating a calculation associated with the user-modifiable field based on the user-selected source form.

5. The method of claim 1, wherein the worksheet comprises a list of the plurality of financial source forms.

6. The method of claim 1, wherein the worksheet comprises default field text prior to dynamically populating the worksheet.

7. A computer readable medium comprising computer readable program code embodied therein for causing a computer system to:
    display a worksheet comprising a user-modifiable field,
    receive, after displaying the worksheet, a user selection of a source form of the plurality of financial source forms to obtain a user-selected source form; and
    dynamically populate the worksheet with field text selected using conditional logic based on the user-selected source form,
    wherein the field text is positioned on the worksheet outside the user-modifiable field,
    wherein the field text describes content of the user-modifiable field, and
    wherein the worksheet is used for tax preparation.

8. The computer readable medium of claim 7, wherein the computer readable program code further causes the computer system to dynamically populate the worksheet with field text selected by re-calculating a conditional expression within a calculated field on the worksheet.

9. The computer readable medium of claim 7, wherein at least one of the plurality of financial source forms is a pension distribution form.

10. The computer readable usable medium of claim 7, wherein the computer readable program code further causes the computer system to dynamically update a calculation associated with the user modifiable field based on the user-selected source form.

11. The computer readable medium of claim 7, wherein the worksheet comprises a list of the plurality of financial source forms.

12. The computer readable medium of claim 7, wherein the worksheet comprises default field text prior to dynamically populating the worksheet.

13. A system for supporting a plurality of financial source forms comprising:
    a processor; and
    a memory, coupled to the processor, wherein the memory stores program instructions executable by the processor to support:
        a worksheet comprising a user-modifiable field and configured to receive a user selection of a source form of the plurality of financial source forms to obtain a user-selected source form; and
        an application logic connected to the worksheet and configured to dynamically populate the worksheet with field text selected using conditional logic based on the user-selected source form,
    wherein the field text is positioned on the worksheet outside the user-modifiable field,
    wherein the field text describe content of the user modifiable field, and
    wherein the worksheet is used for tax preparation.

14. The system of claim 13, wherein the application logic is further configured to dynamically populate the worksheet with field text selected by re-calculating a conditional expression within a calculated field on the worksheet.

15. The system of claim 13, wherein at least one of the plurality of financial source forms is a pension distribution form.

16. The system of claim 13, wherein the application logic is further configured to dynamically update a calculation associated with the user-modifiable field based on the user-selected source form.

17. The system of claim 13, wherein the worksheet comprises a list of the plurality of financial source forms.

18. The system of claim 13, wherein the worksheet comprises default field text prior to the application logic dynamically populating the worksheet.

* * * * *

UNITED STATES PATENT AND TRADEMARK OFFICE
CERTIFICATE OF CORRECTION

PATENT NO.        : 7,712,023 B1
APPLICATION NO.   : 11/345250
DATED             : May 4, 2010
INVENTOR(S)       : Donald E. Bryan Page 1 of 1

It is certified that error appears in the above-identified patent and that said Letters Patent is hereby corrected as shown below:

In the claims, claim 10, column 10, line 12, the word "usable" should be deleted.

Signed and Sealed this

Third Day of August, 2010

David J. Kappos
*Director of the United States Patent and Trademark Office*